United States Patent
Lesinski, Jr.

(10) Patent No.: US 10,166,964 B2
(45) Date of Patent: Jan. 1, 2019

(54) PEDALLESS ELECTRONICALLY CONTROLLED HYDRAULIC BRAKING SYSTEM WITH REDUNDANT PUMP

(71) Applicant: Continental Automotive Systems, Inc., Auburn Hills, MI (US)

(72) Inventor: Roger John Lesinski, Jr., Royal Oak, MI (US)

(73) Assignee: CONTINENTAL AUTOMOTIVE SYSTEMS, INC., Auburns Hills, MI (US)

(*) Notice: Subject to any disclaimer, the term of this patent is extended or adjusted under 35 U.S.C. 154(b) by 78 days.

(21) Appl. No.: 14/796,257

(22) Filed: Jul. 10, 2015

(65) Prior Publication Data
US 2016/0009267 A1 Jan. 14, 2016

Related U.S. Application Data

(60) Provisional application No. 62/022,739, filed on Jul. 10, 2014.

(51) Int. Cl.
| | | |
|---|---|---|
| *B60T 17/22* | (2006.01) | |
| *B60T 7/12* | (2006.01) | |
| *B60T 8/88* | (2006.01) | |
| *B60T 8/32* | (2006.01) | |
| *B60T 8/40* | (2006.01) | |

(52) U.S. Cl.
CPC .............. *B60T 17/221* (2013.01); *B60T 7/12* (2013.01); *B60T 8/326* (2013.01); *B60T 8/885* (2013.01); *B60T 8/4081* (2013.01); *B60T 2270/402* (2013.01)

(58) Field of Classification Search
CPC ........ B60T 17/221; B60T 15/045; B60T 7/12; B60T 8/171
USPC ............ 303/122.05, 122.12, 122.13, DIG. 9, 303/113.1–113.5
See application file for complete search history.

(56) References Cited

U.S. PATENT DOCUMENTS

| | | | | |
|---|---|---|---|---|
| 4,307,917 A | * | 12/1981 | Hasselbacher | B60T 13/22 188/352 |
| 5,187,666 A | | 2/1993 | Watanabe | |
| 5,456,523 A | * | 10/1995 | Boehringer | B60T 8/325 188/106 P |
| 6,019,436 A | * | 2/2000 | Siepker | B60T 7/12 188/106 F |
| 6,021,367 A | | 2/2000 | Pilutti et al. | |
| 6,132,012 A | * | 10/2000 | Ishii | B60T 8/4036 303/122.09 |
| 6,296,325 B1 | * | 10/2001 | Corio | B60T 8/1703 244/110 A |

(Continued)

*Primary Examiner* — Bradley T King
*Assistant Examiner* — James K Hsiao (57) ABSTRACT

A braking system for an autonomous vehicle includes a brake device that is configured to brake a vehicle wheel. A first control system includes a first pump fluidly connected to the brake device via a hydraulic circuit. A second control system includes a second pump fluidly connected to the brake device via the hydraulic circuit. The second pump is fluidly connected in parallel with the first pump. A controller is in communication with the first and second control systems. The controller is configured to detect a fault in the first control system. The controller is configured to command the second pump to pressurize the hydraulic circuit in response to the failure.

13 Claims, 5 Drawing Sheets

(56) References Cited

U.S. PATENT DOCUMENTS

| | | | |
|---|---|---|---|
| 6,299,261 B1* | 10/2001 | Weiberle | B60T 8/885 303/122.04 |
| 6,345,225 B1* | 2/2002 | Bohm | B60T 8/321 180/197 |
| 6,517,170 B1* | 2/2003 | Hofsaess | B60T 7/042 303/10 |
| 8,287,054 B2 | 10/2012 | Beer | |
| 8,544,965 B2 | 10/2013 | Sakuma | |
| 2001/0045772 A1* | 11/2001 | Schmidt | B60T 7/042 303/113.1 |
| 2002/0050739 A1* | 5/2002 | Koepff | B60T 8/326 303/122.09 |
| 2006/0017319 A1* | 1/2006 | Kohl | B60T 8/4036 303/11 |
| 2009/0292415 A1* | 11/2009 | Averbeck | B60T 8/32 701/29.1 |
| 2011/0160970 A1 | 6/2011 | Crombez | |
| 2013/0245910 A1* | 9/2013 | Watanabe | B60T 7/042 701/79 |
| 2014/0152085 A1* | 6/2014 | Biller | B60T 8/4081 303/10 |
| 2014/0168826 A1* | 6/2014 | Kalbeck | B60T 17/02 361/22 |
| 2014/0188359 A1* | 7/2014 | Chen | B60T 13/52 701/70 |
| 2014/0190759 A1 | 7/2014 | Agnew et al. | |
| 2015/0151726 A1 | 6/2015 | McClain et al. | |

* cited by examiner

PEDALLESS ELECTRONICALLY CONTROLLED HYDRAULIC BRAKING SYSTEM WITH REDUNDANT PUMP

CROSS REFERENCE TO RELATED APPLICATION

This application claims priority to U.S. Provisional Application No. 62/022,739 filed on Jul. 10, 2014.

BACKGROUND

This disclosure relates to an automotive vehicle hydraulic braking system that is electronically controlled to decelerate and stop a vehicle via a pump. The braking system also enables safety features such as anti-lock braking and stability control.

Vehicles that can be driven autonomously are able to stop themselves when their onboard sensors determine that the vehicle needs to slow or stop. Thus, driver input or assistance is not required to stop the vehicle. Typically, vehicle brake systems include a brake caliper or similar braking device associated with each vehicle wheel. Pressurized hydraulic fluid is provided to each braking device to selectively arrest rotation of the associated vehicle wheel. The pressurized fluid is provided to the braking devices through various valves and hydraulic lines. A loss of fluid pressure can adversely affect operation of the braking system.

SUMMARY

In one exemplary embodiment, a braking system for an autonomous vehicle includes a brake device that is configured to brake a vehicle wheel. A first control system includes a first pump fluidly connected to the brake device via a hydraulic circuit. A second control system includes a second pump fluidly connected to the brake device via the hydraulic circuit. The second pump is fluidly connected in parallel with the first pump. A controller is in communication with the first and second control systems. The controller is configured to detect a fault in the first control system. The controller is configured to command the second pump to pressurize the hydraulic circuit in response to the failure.

In a further embodiment of the above, the first control system includes a first motor coupled to the first pump. A first electronic control unit is in communication with the motor to drive the pump.

In a further embodiment of any of the above, the fault relates to the first pump.

In a further embodiment of any of the above, the controller is configured to command the first electronic control unit to activate the second pump in response to the fault.

In a further embodiment of any of the above, the fault relates to the first motor.

In a further embodiment of any of the above, the controller is configured to command the first electronic control unit to activate the second pump in response to the fault.

In a further embodiment of any of the above, the fault relates to the first electronic control unit.

In a further embodiment of any of the above, the second control system includes a second electronic control unit. The controller is configured to command the second electronic control unit in response to the fault.

In a further embodiment of any of the above, a pressure sensor is in communication with the hydraulic circuit. The fault associated with a low pressure is detected by the pressure sensor.

In a further embodiment of any of the above, there are four braking devices. The first and second pumps are each in fluid communication with all of the four braking devices.

In a further embodiment of any of the above, at least one valve is arranged upstream from each of the braking devices. The controller is in communication with the valves and is configured to regulate fluid through the valves to selectively control braking of each of the braking devices.

In a further embodiment of any of the above, at least one valve includes a control valve, a check valve, a relief valve and a cut valve.

In a further embodiment of any of the above, the second pump is arranged in a fluid loop. An accumulator is fluidly connected to the fluid loop between an inlet and an outlet of the second pump.

In a further embodiment of any of the above, the braking system does not have a manually operated brake pedal.

In another exemplary embodiment, a method controlling a brake system includes the steps of operating a brake circuit with a first control system to pressurize a brake circuit. A fault is detected with the operating step relating to an undesired pressure in the brake circuit. A second control system is activated to pressurize the brake circuit in response to the detected fault.

In a further embodiment of any of the above, the undesired pressure is a low pressure.

In a further embodiment of any of the above, the operating step includes driving a pump with a motor to pressurize the brake circuit. The fault relates to at least one of the pump and the motor.

In a further embodiment of any of the above, the activating step includes activating a second pump in the second control system.

In a further embodiment of any of the above, the operating step includes commanding a pump with an electronic control unit. The fault relates to the electronic control unit.

In a further embodiment of any of the above, the activating step includes activating a second electronic control unit.

BRIEF DESCRIPTION OF THE DRAWINGS

The disclosure can be further understood by reference to the following detailed description when considered in connection with the accompanying drawings wherein.

DETAILED DESCRIPTION

Figure 1:
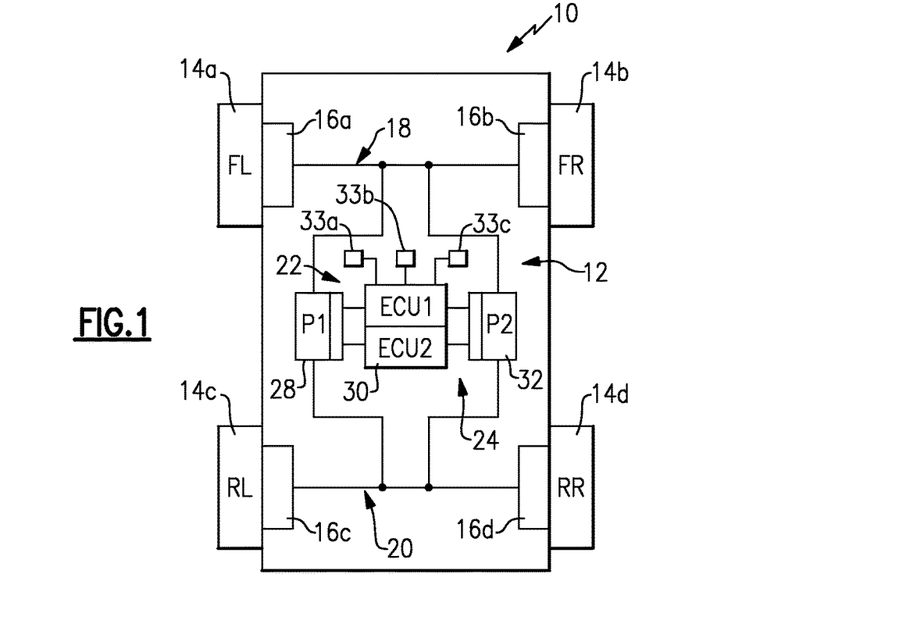
FIG. 1 is a schematic view of a vehicle with a brake system embodiment.

A autonomously controlled vehicle 10 is schematically illustrated in FIG. 1. Such vehicles do not have brake pedals manually operated by the vehicle occupant. The vehicle 10 includes a braking system 12 for selectively controlling the braking input to wheels 14a-14d in response to commands from a controller for automated braking. A braking device 16a-16d is typically associated with each of the wheels 14a-14d and are typically provided by a brake caliper or other braking element.

Hydraulic circuits, schematically illustrated by fluid lines 18, 20 and connections carry pressurized fluid to the braking devices 16a-16d to selectively actuate the brakes during vehicle operation.

In the case of an autonomously controlled vehicle, it may be desirable to have some redundancy in the braking system to ensure braking capability is maintained in the event of a brake component malfunction or failure. To this end, first and second control systems 22, 24 are provided in the braking system. During normal operation, a first electronic control unit (ECU) 26 and first pump 28 of the first control system 22 are used to selectively actuate the braking devices 16a-16d. In the event of a component failure in the first control system 22, the second control system 24, which includes a second electronic control unit (ECU) 30 and second pump 32, may take over for a failed component. The first and second electronic control units 30, 32 may be in communication with any number of components within the braking system 12 in order to perform the functions described herein.

The first and second electronic control units 26, 30 may be part of the controller or discrete units. Various vehicle sensors 33a-33c communicate with the first and second ECUs 26, 30 to provide inputs concerning braking and vehicle operating conditions to the controller that are useful for providing desired braking and vehicle stability. Example inputs include vehicle speed, vehicle direction, traction at each wheel, steering wheel position, G-force and other information.

Figure 2:
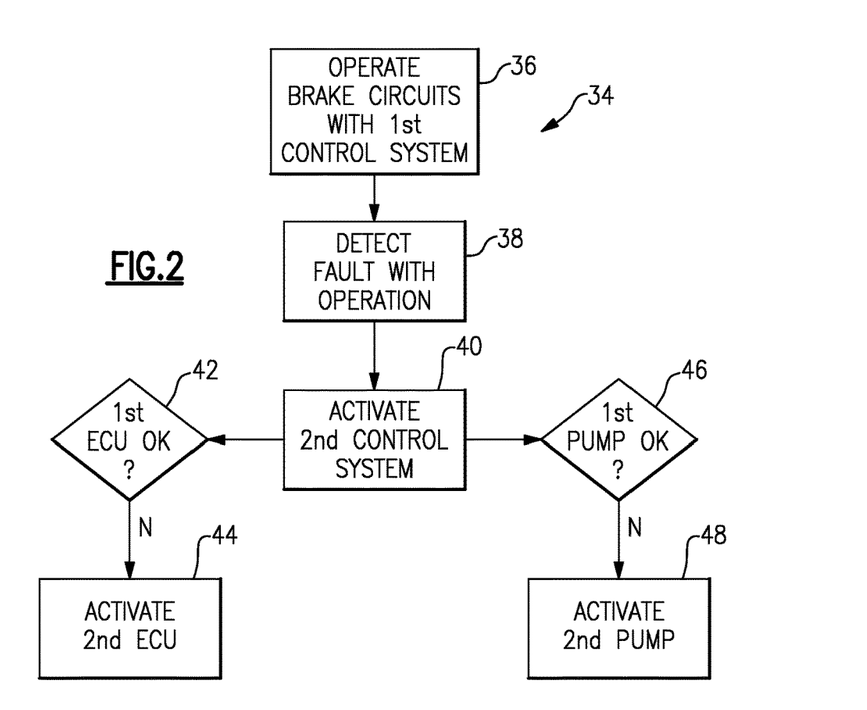
FIG. 2 illustrates a method of controlling the braking system shown in FIG. 1.

An example method of controlling vehicle braking system is illustrated at 34 in FIG. 2. Under normal operating conditions, the first control system 22 operates the hydraulic circuits to provide pressurized fluid that controls the braking devices 16a-16d, as indicated at block 36. The controller monitors the various braking system components to detect a fault with a component's operation, as indicated at block 38. Faults, for example, may relate to low hydraulic pressure, which may be indicative of insufficient pumping by the first pump 28 or a malfunction of the first ECU 26.

In the even that a fault is detected, the controller activates the second control system 24 to pressurize the brake circuit in response to the detected fault, as indicated at block 40. Within block 40, (1) the second control system 24 may operate in combination with certain components of the first control system 22 (such as the first electronic control unit 26, the control valves and cut valves, discussed below, and one or more pressure sensors) or (2) the second control system 24 may operate on its own (i.e., independent of the first control system 22). If the first ECU 26 is determined to have caused the fault, as indicated at block 42, the second ECU 30 is activated, as indicated at block 44. If the first pump is determined to have caused the fault, as indicated at block 46, the second pump 32 is activated, as indicated at block 48. In this manner, the backup second control system 24 is able to maintain pressure within the hydraulic circuits of the braking system 12 such that the braking devices 16a-16d remain functional during vehicle operation.

Figure 3A:
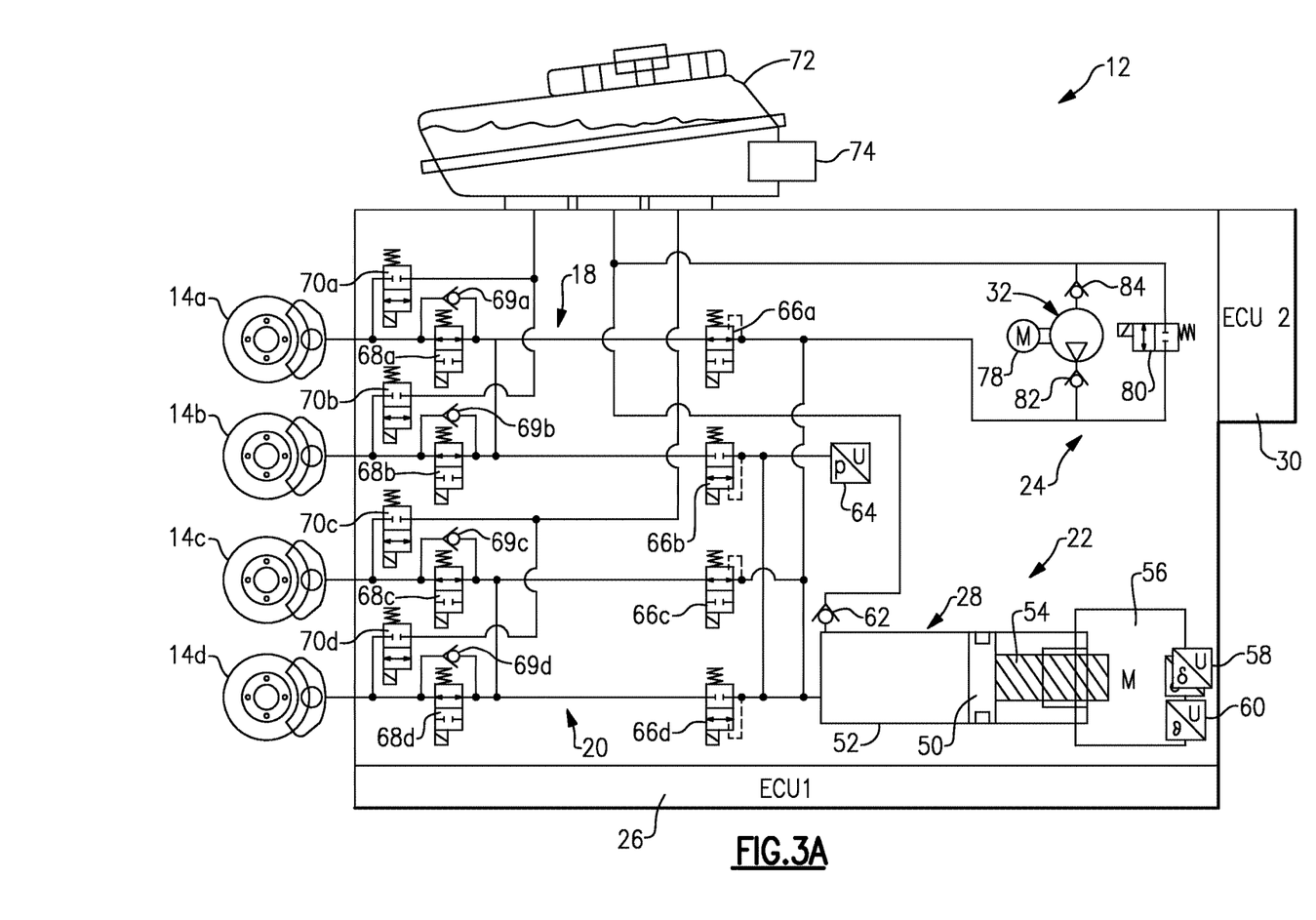
FIG. 3A is a schematic view of an exemplary inactive braking system in accordance with the invention in which a secondary single piston pump with electric motor is electrically operated by a controller if the primary electric pump is deemed inoperable for a brake pedal less vehicle.

An example braking system 12 is illustrated in FIG. 3A. It should be understood that the hydraulic circuits illustrated are exemplary only, and the circuits may be configured in a manner other than depicted. Additional and/or different braking components may be used. In one example, a linear pump with electric brushless motor controls the flow of pressurized brake fluid from a brake fluid reservoir to several wheel brakes. In the example, the first pump 28 is provided by a piston 50 arranged within a cylinder 52 and move relative thereto by a screw 54 actuated by a first motor 56 to provide the first pump 28. A failure of the motor 56 may also manifest as a first pump 28 failure. Angular position sensor 58 and temperature sensor 60 provide feedback to the controller relating to the operation of the pump 28. The sensors 56, 58 along with pressure sensor 64 that monitors the pressure of the hydraulic circuits provide feedback to the controller to provide information that may be indicative of a malfunction of the first ECU 26 and/or first pump 28, such as a loss of hydraulic pressure in the braking system. Fluid pressure monitoring via a pressure sensor 64 is further useful in identifying how much pressure in needed to stop the vehicle when either the linear pump or backup pump is activated. All this is accomplished by a vehicle with the appropriate sensors to perform these tasks and that can be operated autonomously.

The second pump 32 is fluidly connected in parallel with the first pump 34. As a result, one pump does not inhibit flow from the other pump if inactivated, which minimizes the restrictions within the system.

In the example, at least one valve is arranged upstream from each of the braking devices 14a-14d. The controller is in communication with the valves (connections not shown for clarity) and is configured to regulate fluid through the valves to selectively control braking of each of the braking devices 14a-14d. An autonomous automotive electronically controlled hydraulic brake system equipped for anti-slip control and for active brake interventions may not include a manually actuated brake pedal to stop the vehicle. In such a vehicle, the primary method to stop the vehicle is performed by controlling a fluid pump.

In the example, cut valves 66a-66d, control valves 68a-68d, check valves 69a-69d and pressure relief valves 70a-70d are associated with each of the braking devices 14a-14d to selectively control braking of the braking elements independent of one another for desired control of the overall braking system. Each circuit features a pressure relief line having a normally-closed pressure relief valve 70a-70d. Pressure can be modulated for dynamic braking events via the cut valves 66a-66d.

A fluid reservoir 72 supplies fluid as needed to the hydraulic circuit as the braking devices 14a-14d are operated. A level sensor 74 detects whether there is sufficient fluid within the fluid reservoir 72.

An integrated backup or secondary pump with its own electronic controller and pressure relief valve is used in case the primary pump or primary electronic controller fails. In the example, the second pump 32 is driven by second motor 78. Check valves 82, 84 are provided at the pump outlet and inlet, respectively. A pressure relief valve 80 permits the fluid to flow from the outlet 82 to the inlet 84 at predetermined pressures and prevent an overpressure condition.

Figure 3B:
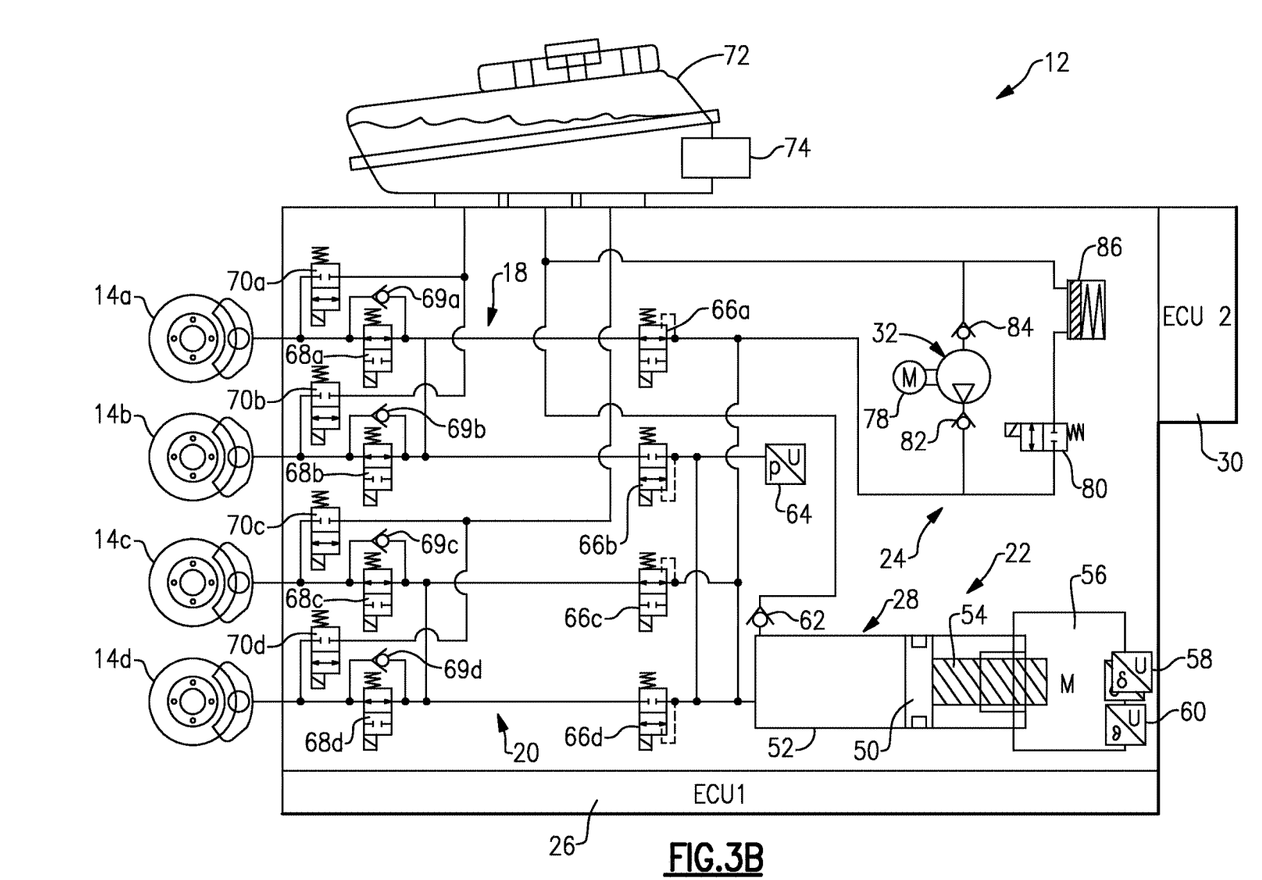
FIG. 3B is a schematic view of the braking system shown in FIG. 3A with an accumulator.

FIG. 3B illustrates the same system as FIG. 3A but with an accumulator 86 in the hydraulic loop, which smooths out the pressure within the hydraulic system.

Figure 4A:
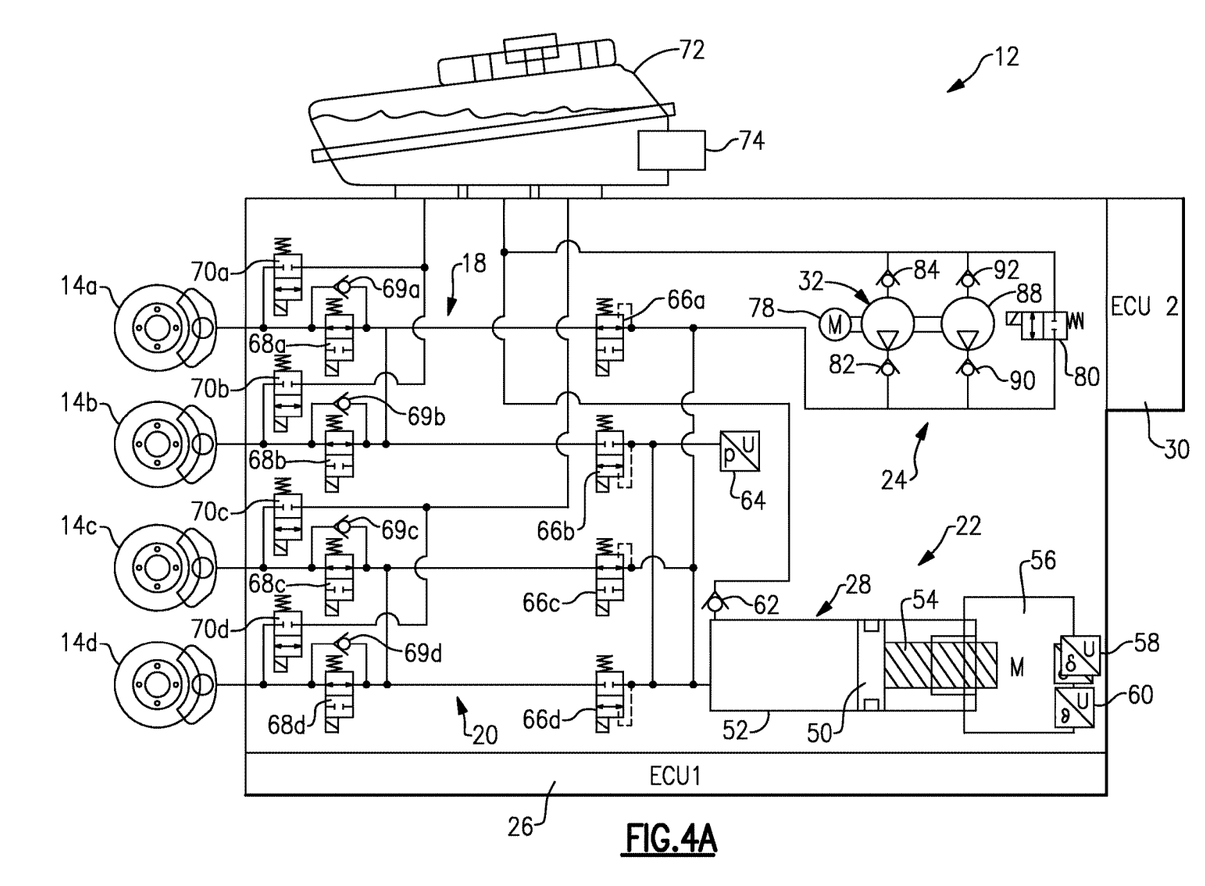
FIG. 4A is a schematic view of an exemplary inactive braking system in accordance with the invention in which a secondary dual piston pump with electric motor is electrically operated by a controller if the primary electric pump is deemed inoperable for a brake pedal less vehicle.

FIG. 4A depicts the same braking system as illustrated in FIG. 3A, but with a third pump 88 having third and fourth check valves 90, 92 respectively arranged at the pump outlet and inlet.

Figure 4B:
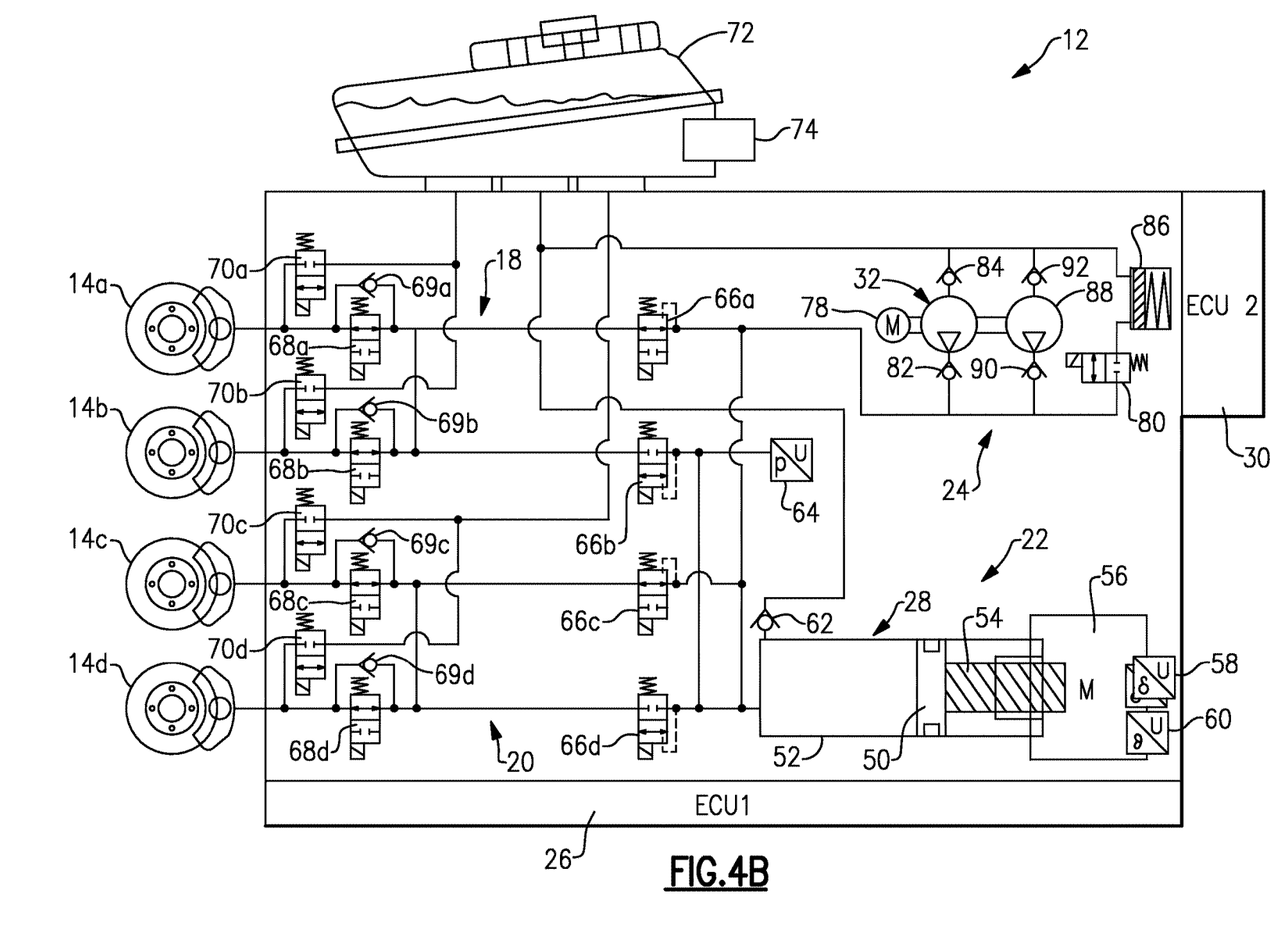
FIG. 4B is a schematic view of the braking system shown in FIG. 4A with an accumulator.

FIG. 4B is the same braking system as illustrated in FIG. 4A but with the accumulator 86 described in connection with FIG. 3B.

In operation, for an autonomous vehicle, the disclosed brake system 12 uses an existing electronically controlled hydraulic brake system without the typical manually operator-actuated brake actuation unit (tandem master cylinder, booster, and brake pedal assembly). A secondary pump with a pressure relief valve and secondary electronic controller are integrated into the existing electronically controlled hydraulic brake system The linear pump with electronic brushless motor is used as the primary source for stopping and slowing the vehicle during normal brake applications. The linear pump is also used for other "active braking" modes such as traction control system (TCS), electronic stability program (ESP), active rollover protection (ARP), etc. These functions are accomplished via onboard vehicle sensors (not shown) that send signals to the electronic controller, either the primary (ECU1) and/or the secondary (ECU2).

For example, either a single piston (FIGS. 3A and 3B) or dual piston pump (FIGS. 4A and 4B) with DC brushed motor is used as a backup solution should the linear pump or its electronics fail. The motor could be a DC brushless motor in some examples. Other types of pumps may also be used. If the linear pump fails and the primary electronic controller can still function, the secondary pump can be used to build brake pressure, while the primary electronic controller is used to actuate the control valves and cuts valves so that the vehicle can still perform "active braking." In one example, the cut valves include two valves that are normally open, and two valves that are normally closed. These cut valves control the pressurized fluid coming from the pump 28, for example, to the calipers. In this example the control valves include four normally open valves and four normally closed valves (i.e., one normally open valve and one normally closed valve per wheel circuit). These control valves allow pressure to be directed to the wheel calipers, and allow pressure to be held at the wheel calipers and then subsequently dumped when no longer needed. A pressure relief valve is incorporated should the linear pump and primary electronic controller fail and the secondary pump is used to build pressure, where that pressure needs to be relieved via the secondary electronic controller at the end of a brake event.

An added benefit with the second integrated pump is that both pumps could be actuated at the same time for features that require emergency braking and pressure builds that cannot be achieved with the primary linear pump alone.

Although an example embodiment has been disclosed, a worker of ordinary skill in this art would recognize that certain modifications would come within the scope of the claims. For that reason, the following claims should be studied to determine their true scope and content.

What is claimed is:

1. A braking system for an autonomous vehicle comprising:
    four brake devices each configured to respectively brake one of four vehicle wheels;
    a first control system including a first pump fluidly connected to all four brake devices via at least one of a first hydraulic circuit and a second hydraulic circuit, wherein the first control system includes a first motor coupled to the first pump;
    a second control system including a second pump fluidly connected to all four brake devices via the at least one of the first and second hydraulic circuit, the second pump fluidly connected in parallel with the first pump, wherein the second control system includes a second motor coupled to the second pump; and
    a controller in communication with the first and second control systems, the controller configured to detect a fault in the first control system, and the controller configured to determine which component of the first control system contains the fault and to activate a corresponding component of the second control system in response to the detected fault such that the second control system operates in combination with operational components of the first control system.

2. The braking system according to claim 1, wherein a first electronic control unit in communication with the motor to drive the pump.

3. The braking system according to claim 2, wherein the fault relates to the first pump and the second pump is activated to pressurize the first and the second hydraulic circuits.

4. The braking system according to claim 3, wherein the controller is configured to command the first electronic control unit to activate the second pump in response to the fault.

5. The braking system according to claim 2, wherein the fault relates to the first motor.

6. The braking system according to claim 5, wherein the controller is configured to command the first electronic control unit to activate the second pump in response to the fault.

7. The braking system according to claim 2, wherein the fault relates to the first electronic control unit.

8. The braking system according to claim 7, wherein the second control system includes a second electronic control unit, and the controller is configured to command the second electronic control unit in response to the fault.

9. The braking system according to claim 1, comprising a pressure sensor in communication with the first hydraulic circuit and the second hydraulic circuit, the fault associated with a low pressure in one of the hydraulic circuits detected by the pressure sensor.

10. The braking system according to claim 1, wherein at least one valve is arranged upstream from each of the braking devices, and the controller is in communication with the valves and configured to regulate fluid through the valves to selectively control braking of each of the braking devices.

11. The braking system according to claim 10, wherein the at least one valve includes a control valve, a check valve, a relief valve and a cut valve.

12. The braking system according to claim 1, wherein the second pump is arranged in a fluid loop, and an accumulator is fluidly connected to the fluid loop between an inlet and an outlet of the second pump.

13. A braking system for an autonomous vehicle comprising:
    four brake devices each configured to respectively brake one of four vehicle wheels;
    a first control system including a first pump fluidly connected to all four brake devices via at least one of a first hydraulic circuit and a second hydraulic circuit, wherein the first control system includes a first motor coupled to the first pump;
    a second control system including a second pump fluidly connected to all four brake devices via the at least one of the first and second hydraulic circuit, the second pump fluidly connected in parallel with the first pump, wherein the second control system includes a second motor coupled to the second pump; and a controller in communication with the first and second control systems, the controller configured to detect a fault in the first control system, and the controller configured to determine which component of the first control system contains the fault and to activate a corresponding component of the second control system in response to the detected fault; and wherein the braking system does not have a manually operated brake pedal.

* * * * *